Oct. 22, 1963  R. W. REICH  3,108,192
POWER CHARGING AND CONTROL MECHANISM FOR BATTERY
OPERATED ELECTRICAL APPLIANCES
Filed Oct. 19, 1962
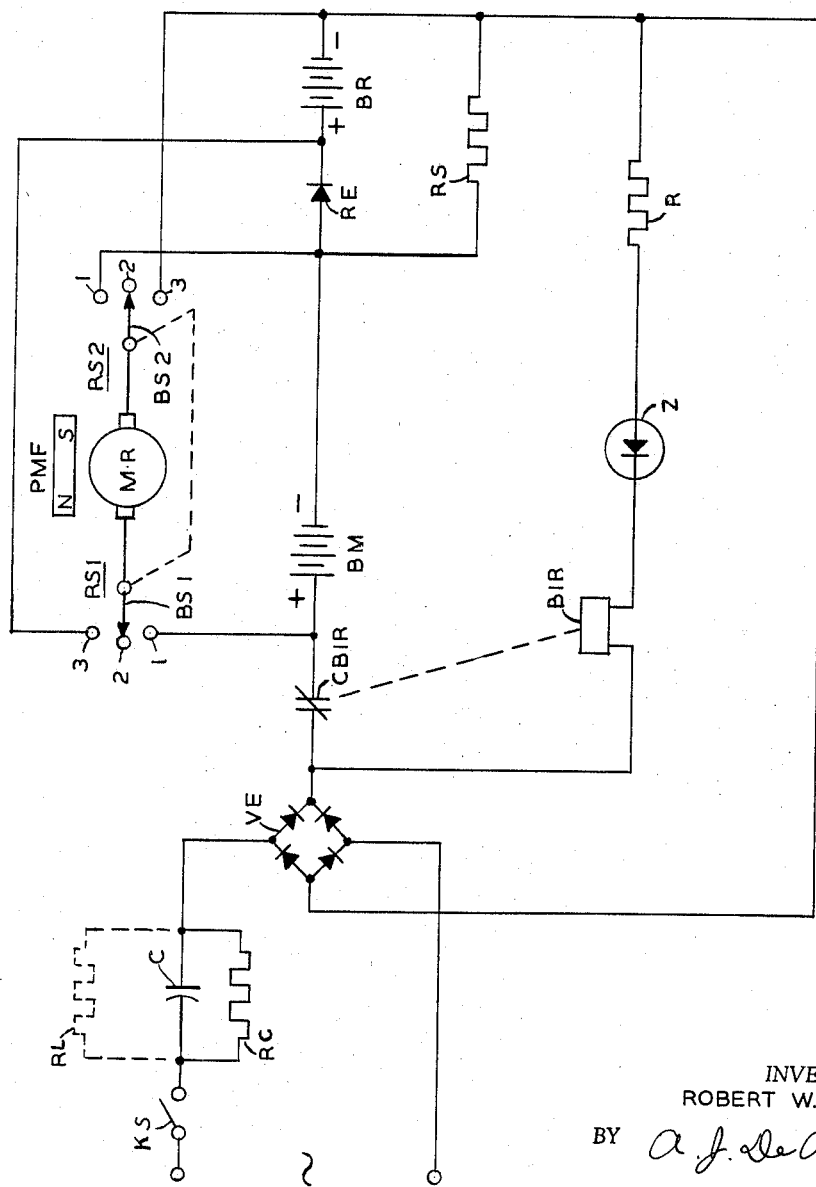
INVENTOR.
ROBERT W. REICH
BY
ATTORNEY 3,108,192
POWER CHARGING AND CONTROL MECHANISM FOR BATTERY OPERATED ELECTRICAL APPLIANCES
Robert W. Reich, Freiburg im Breisgau, Germany
Filed Oct. 19, 1962, Ser. No. 231,722
5 Claims. (Cl. 307—66)

The invention relates to power, charging and control mechanisms for battery operated electrical appliances, and especially to such mechanisms for portable appliances of relatively small size, weight and capacity adapted for low voltage actuation from a self-contained rechargeable direct power source, forming part of the appliance.

Battery operated portable appliances, such as an electric dry shaver apparatus, having a driving motor, a switch and a rechargeable battery mounted in the shaver container for portable use, are already well known in the art. Such battery operated portable appliances usually exhaust their self-contained power source unexpectedly. For example, in photo-flash apparatus, it frequently happens that the batteries are suddenly discharged and no more flash energy is available. Work has to therefore be interrupted, the battery recharged, or a second flash apparatus, if available, used to finish the work.

In electric battery operated shavers, this is particularly unpleasant, since, when a battery is exhausted, the user is unable to finish his shave.

It is, therefore, desirable to provide, in addition to the battery for normal operation, a reserve battery as part of the electrical appliance for emergency operation thereof. Such a reserve battery need only be of relatively small capacity in relation to the capacity of the main battery, such as, in a dry shaver, for example, of capacity to provide only sufficient power for one complete shave. With such an arrangement, exhaustion of the main battery serves as an indication to the user that the battery needs recharging. At the same time, the inconvenience of interrupting the work being then performed by the appliance, such as a shave, is obviated and recharging of the batteries may be postponed to a more convenient time.

It is also desirable to provide mechanism to enable the simultaneous recharging of both batteries, the main and reserve, while mounted in their operating positions, notwithstanding that such batteries are of different capacities.

However, due to the peculiarities of the usual gas-tight storage batteries used, such as nickel-cadmium batteries, it is extremely difficult to charge such batteries simultaneously, if their capacities are different. The manufacturers of the batteries have had to provide two different charging circuits, one for each of the batteries of different capacities. Such an arrangement is expensive, requires duplication of components with the consequent difficulty in fitting such components into a portable appliance, and creates problems in arranging the charging and operating controls of the appliance.

It is, therefore, an object of this invention to provide battery operated, electrical, portable appliances equipped with a main battery of a certain operating capacity and a reserve battery of capacity relatively small compared to that of the main battery, and means for selectively energizing the appliance from either battery.

It is a further object to provide mechanism for permitting selective energization of the appliance from either a main rechargeable battery of a certain capacity or a reserve rechargeable battery of a much smaller capacity relative to that of the main battery, and, alternately for safely and efficiently recharging both batteries simultaneously from an external power source, while mounted in their operating positions.

It is another object to include in such mechanism means for automatically detecting when both batteries are fully recharged and for automatically discontinuing the recharging operation in response to such detection.

Still another object is to provide simple, efficient and improved mechanism for simultaneously recharging batteries of different capacities while connected in a charging circuit common to the batteries.

It is yet another object to provide mechanism for simultaneously charging batteries of different capacities, while limiting the charging power automatically to a safe value, during the charging operation, and automatically discontinuing the charging operation when the batteries have been recharged sufficiently.

The invention involves providing for an electrical portable appliance, a rechargeable main battery, as a source of power for normal operation thereof, and a rechargeable reserve battery, as a smaller source of power for emergency operation thereof, and means for selectively energizing the appliance from either battery and, alternately for placing both batteries simultaneously "on charge" in a common charging circuit from an external power source. The control mechanism is such that the charging of both batteries simultaneously is automatically maintained at a safe but efficient power level, and automatically terminated, upon the batteries attaining a predetermined "fully charged" condition.

In carrying out the invention, according to a preferred embodiment, electrical circuitry is provided for selectively energizing the appliance operating mechanism from either a main battery of a certain capacity, or a reserve battery of a relatively smaller capacity, and for effectively isolating one battery from the other, during operation of the appliance. In addition, the batteries may both be disconnected from the appliance energizing circuit and connected in series with each other for recharging from an external alternating power source.

Power from the external source is rectified and applied to the batteries at a reduced voltage magnitude equal to the summation of both battery voltages. A current limiting capacitor is connected in the input part of the circuit for reducing the magnitude of the external alternating applied voltage to the charging voltage magnitude desired. The capacitor is selected of an electrical capacity equal to the sum of the main battery plus reserve battery voltage magnitudes, and for the maximum charging current of the battery of larger capacity (main battery). The battery of lower capacity (reserve) is connected in series with the main battery through a rectifier having a current capacity equal to the maximum safe charging current of the reserve battery. A shunting resistor selected of ohmic value to match the internal resistance of the battery of lower capacity, is connected to shunt the rectifier and reserve battery. The rectifier prevents discharge of the battery of lower capacity through the shunting resistor, while the latter shunts excess charging current around the reserve battery.

With this arrangement, charging power is efficiently applied to the batteries at a voltage magnitude equal to the sum of both battery voltages and at the maximum safe charging current for the main battery. Advantageously, the external source voltage need be reduced less than is usual, and the charging current need be maintained only at the charging current required for the battery of largest capacity, the main battery. This obviates the usual requirement, especially in cases where the charging period is not precisely prescribed, to maintain charging current to each individual battery within accurate limits. In addition, the batteries may be selectively used independently of each other to energize the portable appliance, while the circuit components utilized in the arrangement, are standard of small size and of relatively low cost.

Means to terminate automatically the charging operation are also incorporated in the subject arrangement. A zener diode is connected in series with a current limiting resistor and a bimetallic relay, and the series circuit is connected in shunting relation to both batteries. The diode is selected to conduct, during charging operation, a negligible amount of current, until the batteries attain a predetermined sufficient charge. It then conducts a sharply increased amount of current sufficient in magnitude to cause actuation of the bimetallic relay. Contacts of the bimetallic relay are connected in the input of the charging circuit, and when the relay is actuated, are effective to interrupt the charging circuit, discontinuing the charging operation. Thus, the "full charge" condition of the batteries is detected by the zener diode, and charging power automatically disconnected in response to such detection. Connection of the batteries in series, during charging operation, and the consequent utilization of a relatively large charging voltage, as has been stated previously, advantageously makes possible the use of commercially obtainable zener diodes having a sharp "cut off" for accurate detection.

Features and advantages of the invention will be seen from the above from the following description of operation when considered in conjunction with the drawing and from the appended claims.

In the drawing is shown a simplified schematic wiring diagram of electrical power, charging and control mechanism for battery operated, electrical appliances having two rechargeable unidirectional power sources, in accordance with the invention.

For convenience, the subject invention will be described as applied to an electric, dry shaver apparatus selectively operable from either of two rechargeable batteries of different capacities, it being understood, nevertheless, that the invention is not so limited and without departing from the spirit and scope thereof is applicable to similar electrical appliances and to the simultaneous charging of more than two batteries.

Referring to the drawing, MR designates the rotor of a direct current driving motor for a dry shaver apparatus, and PMF designates its permanent magnet field. BM designates a rechargeable, relatively low voltage battery for energizing the shaver driving motor for normal operation, while BR designates a rechargeable battery for energizing the shaver driving motor for emergency operation. Battery BR is preferably selected of a capacity to drive the motor for only a period sufficient to complete one shave, which capacity is relatively small compared to that of battery BM. RS1 and RS2 designate two three position, rotary switches for connecting motor rotor MR selectively to either of batteries BM or BR, as desired, for energization therefrom, and for disconnecting motor rotor MR from both batteries during recharging operation of the batteries. Switches RS1 and RS2 are mechanically interconnected for bi-directional rotation of their respective brushes BS1, BS2 in unison but in opposite direction one to the other. Each switch is provided with three stationary contacts, designated 1, 2 and 3, for cooperation with its associated brush (BS1, BS2).

Motor rotor MR is connected between brush BS1 of switch RS1 and brush BS2 of switch RS2, the switches being shown in their respective normally open, mid positions, maintaining motor rotor MR disconnected from both batteries. Batteries BM and BR are connected in series with each other through a rectifier RE which prevents current flow from battery BR to battery BM. The positive terminal + of battery BM is connected directly to stationary contact 1 of switch RS1, while the positive terminal + of battery BR is connected to the output of rectifier RE and to stationary contact 3 of switch RS1. The negative terminal — of battery BM is connected to the input of rectifier RE and directly to stationary contact 1 of switch RS2, while the negative terminal — of battery BR is connected directly to stationary contact 3 of switch RS2.

In the battery charging circuit portion of the drawing, VE designates a full wave rectifier for providing unidirectional charging power to the batteries from an external alternating power source (not shown), such as, for example, is available from a standard household alternating power outlet. The input of rectifier VE is connected through a capacitor C and a single pole, single throw, manual switch KS to the alternating power source. Resistor RC shunts capacitor C to provide a discharge path for the capacitor on negative half-cycles of the applied alternating power. Capacitor C serves as current limiting means, and takes the place of a transformer. Capacitor C is selected of a value to convert the applied voltage to a charging voltage of approximately the summation voltage of the main and reserve batteries BM and BR, and is effective to limit charging current supplied to the batteries to the maximum safe charging current of main battery BM at the highest line voltage encountered in charging, as for example, from a 110 volt line. Alternately, a resistor RL, shown in broken line outline, may be substituted for current limiting capacitor C and resistor RC for converting the applied alternating power to the voltage and current magnitude desired for charging batteries BM and BR.

The output of rectifier VE is applied directly across series connected batteries BM and BR. Rectifier VE in the series charging circuit of batteries BM, BR is selected of a current carrying capacity determined by the maximum safe charging rate of reserve battery BR. A shunting resistor RS is provided and is connected from the input side of rectifier RE to the negative terminal of reserve battery BR. Resistor RS is selected of an ohmic value matching the internal resistance of reserve battery BR, and is effective to shunt excess charging current around battery BR.

Automatic means for detecting when batteries BM and BR have been recharged sufficiently and for discontinuing charging operation thereof are provided. Such means consist of bimetallic relay BIR, zener diode Z and current limiting resistor R connected in series relationship, one to the other, and in shunting relationship across the series charging circuit of batteries BM and BR. Contacts CBIR of bimetallic relay BIRC are connected in the input of the series battery charging circuit, and are shown normally closed for the unoperated condition of the relay. Zener diode Z is selected so as conduct, under conditions where the batteries have as yet not attained "full charge," a minute amount of current through bimetallic relay BIR, which amount is insufficient to cause operation of the relay. Under conditions where "full charge" is obtained, diode Z suddenly conducts a substantially increased current which flows through bimetallic relay BIR and is of sufficient magnitude to cause actuation of the relay and separation of its contacts CBIR in the charging circuit.

Assume that it is desired to energize the motor from main battery BM for normal shaving operation. In such a case, switches RS1 and RS2 are rotated to place their respective brushes BS1, BS2, in engagement with their respective associated stationary contacts 1, connecting motor rotor MR directly across main battery BM for energization, the energizing circuit extending from the positive terminal + of battery BM through stationary contact 1 presently in engagement with brush BS1 of switch RS1, motor rotor MR and brush BS2 presently in engagement with stationary contact 1 of switch RS2 to the negative terminal — of battery BM.

Next assume that, while the shave is progressing, the shaver apparatus becomes deenergized, unexpectedly interrupting the shave. Also assume that, upon such occurrence, the user rotates switches RS1, RS2 to place their respective brushes BS1, BS2 into engagement with their respective associated stationary contacts 3, connecting motor rotor MR directly across reserve battery BR; the circuit extending from the positive terminal + of battery BR through stationary contact 3 presently in engagement with brush BS1 of switch RS1, motor rotor MR and brush BS2 presently in engagement with stationary contact 3 of switch RS2 to the negative terminal — of battery BR.

Also assume that deenergization of the shaver apparatus is due to main battery BM unexpectedly becoming exhausted, and that all the other shaver components are operating properly. Under such conditions, the shaver driving motor becomes reenergized from reserve battery BR with sufficient energizing power to enable the user to complete his shave and, in addition, automatically informs the user that battery BM requires recharging for subsequent service.

Next assume that subsequent to completion of the shave on reserve battery power, the user desires to recharge both batteries simultaneously from an external power source. Under such conditions, he rotates switches RS1, RS2 to their mid-positions, disconnecting motor rotor MR from the battery circuit. He then connects the battery charging circuit to an external alternating source (not shown), and closes switch KS to apply charging power to the batteries. Capacitor C and full wave rectifier VE convert the applied alternating power to unidirectional charging power and maintain such power at a voltage magnitude equal to the sum of the maximum safe charging voltage of battery BM plus that of BR and at a current magnitude equal to the maximum safe charging current of main battery BM. This current flows from the output of rectifier VE through normally closed contacts CBIR of bimetallic relay BIR, main battery BM, rectifier VE and reserve battery BR. Resistor RS effectively shunts excess current around battery BR, as has been previously stated. A small negligible amount of current also flows through the shunting circuit, consisting of zener diode Z, bimetallic relay BIR and current limiting resistor RL but without effect.

It may be noted that with the subject arrangement, two or more batteries of different capacities may be efficiently charged simultaneously while connected in series, and while using a charging voltage equal to the summation of battery voltages. By providing shunting resistors to shunt excess charging current around the batteries of lower capacity, the charging current may be maintained at the maximum charging current of the battery of largest capacity to obtain the most efficient charging condition.

Next assume that the batteries approach their "full charge" condition. In such a case, zener diode Z abruptly conducts a substantially increased amount of current, sufficient in magnitude to actuate bimetallic relay BIR to operated condition, thereby indicating that the batteries have been charged sufficiently. Bimetallic relay BIR, upon operation, separates its contacts CBIR in the battery charging circuit, interrupting charging power to the batteries, thereby terminating the charging operation automatically.

The subject mechanism provides for selectively energizing an electrical appliance from either of two rechargeable batteries of different capacities, and, alternately, for simultaneously recharging both batteries efficiently from an external source of alternating power, and includes mechanism for limiting the charging power to a safe value, automatically detecting when both batteries are charged sufficiently, and terminating the charging operation, upon such detection.

As changes can be made in the above described construction and many apparently different embodiments of this invention can be made without departing from the scope thereof, it is intended that all matter contained in the above description or shown on the accompanying drawing be interpreted as illustrative only and not in a limiting sense.

What is claimed is:

1. In combination, powered operating means for an electrical appliance; power means for energizing said operating means, said power means including at least two rechargeable electrical batteries of different electrical capacities, one to the other, each of said batteries having a positive and a negative terminal; unidirectional current conducting means electrically connecting the negative terminal of the battery of higher capacity to the positive terminal of that of lower capacity; switching means operable from a first condition to a second condition electrically connecting said higher capacity battery to said operating means for energization of said appliance thereby, to a third condition disconnecting said higher capacity battery from said operating means and connecting said lower capacity battery to said operating means for energization thereby, and back to said first position disconnecting said operating means from both said batteries; power converting means for converting alternating power applied thereto to unidirectional power; a shunting resistor connected from said negative terminal of said higher capacity battery to said negative terminal of said lower capacity battery, said shunting resistor matching the internal resistance of said lower capacity battery; and means for electrically connecting the output of said power converting means across both said batteries.

2. The combination set forth in claim 1 wherein the power converting means converts applied alternating power to unidirectional power at a voltage magnitude equal to the sum of the voltages of said batteries and applies current at a magnitude equal to the maximum safe charging current of said higher capacity battery.

3. The combination set forth in claim 1 wherein current responsive circuit interrupting means and an avalanche type diode are connected in series relationship one to each other and in shunting relationship to said batteries, said diode being selected to conduct, under conditions where said batteries attain full charge, sufficient current to actuate said current responsive means and to prevent such actuation at values below said full charge; said current responsive means, when so actuated, being effective to disconnect said power converting means from said batteries.

4. The combination set forth in claim 1 wherein said power converting means includes a full wave rectifier having two input terminals for connection to a source of alternating power of a certain voltage magnitude, and a current limiting capacitor connected between one of said input terminals and said alternating source, said capacitor being selected to reduce the voltage magnitude applied to said rectifier by said source to a magnitude equal to the summation voltage of said batteries.

5. In combination, operating means for an electrical appliance; a plurality of rechargeable electrical batteries of different electrical capacities one to the other; a plurality of unidirectional current conducting means, said means being one less in number than said plurality of batteries, said batteries being connected in series relationship one to the other in the descending order of their electrical capacities and one each of which said unidirectional current conducting means is interposed between adjacent batteries and effective for preventing current flow from the battery of lower capacity to its adjacent battery of higher capacity; electrical switching means for connecting said operating means for selective energization from any selected one of said batteries; current shunting means, one for each of said interposed unidirectional current conducting means and its associated lower capacity battery for shunting a predetermined amount of excess current around such unidirectional current conducting means and associated battery; power converting means for converting alternating power to unidirectional power at a voltage magnitude equal to the summation voltage of said series connected batteries and at a current magnitude equal to the charging current of the battery of highest capacity, said power converting means applying said unidirectional power across said series connected batteries, and a series circuit consisting of a bimetallic relay, a zener diode and a current limiting resistor, said series circuit being connected across said series battery circuit, said zener diode being selected of electrical characteristics to cause, during charging of said batteries, negligible current flow through said series circuit to maintain said bimetallic relay unactuated, and, under conditions where said batteries attain a predetermined charge, to cause sufficient current to flow through said series circuit to actuate said relay, said relay being effective, upon such actuation, for disconnecting said applied charging power from said batteries.

References Cited in the file of this patent

UNITED STATES PATENTS

| | | |
|---|---|---|
| 2,729,750 | Draper et al. | Jan. 3, 1956 |
| 2,769,131 | Immel | Oct. 30, 1956 |

FOREIGN PATENTS

| | | |
|---|---|---|
| 1,052,266 | Germany | Mar. 5, 1959 |